3,395,118
MODIFIED THERMOPLASTIC
POLYHYDROXYETHERS
Norman H. Reinking, Millington, and Austin E. Barnabeo, Somerville, N.J., assignors to Union Carbide Corporation, a corporation of New York
No Drawing. Original application Oct. 12, 1962, Ser. No. 230,256. Divided and this application Oct. 5, 1966, Ser. No. 584,332
8 Claims. (Cl. 260—47)

This is a division of application Ser. No. 230,256, filed Oct. 12, 1962, and now abandoned.

This invention relates to modified thermoplastic polyhydroxyethers exhibiting improved properties, particularly improved stress cracking resistance. More particularly, the invention relates to method for modifying thermoplastic polyhydroxyethers to exhibit improved properties, particularly improved stress cracking resistance, and to thermoplastic polyhydroxyethers so modified.

Thermoplastic polyhydroxyethers are generally amorphous, transparent, rigid, strong and exceptionally tough materials which have good barrier properties and exhibit excellent adhesion.

Thermoplastic polyhydroxyethers are, therefore, useful as impact resistant molding materials, packaging films, and as adherent coatings and laminate interlayers.

In each of these applications and in myriad other uses increased toughness is always desirable. Further, in certain environments thermoplastic polyhydroxyether may tend to embrittle as a result of stress cracking and/or stress crazing, for example upon exposure to some solvents or when stressed in air at elevated temperatures.

It is the main object, therefore, of the present invention to provide thermoplastic polyhydroxyether exhibiting improved stress cracking resistance, increased molecular weight, higher thermal deformation temperatures, and enhanced solvent resistance.

It is another object to provide method for modifying thermoplastic polyhydroxyether to exhibit such properties.

It has now been discovered in accordance with the present invention that increased molecular weight, higher thermal deformation temperature, and particularly, improved stress cracking resistance properties are imparted to thermoplastic polyhydroxyethers by reacting the polymer with a modifying agent selected from the group consisting of polyepoxides, compounds having a plurality of epoxide groups i.e. those compounds wherein there is a plurality of groups containing an oxirane oxygen bonded to two vicinal carbon atoms, thus

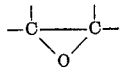

organic silicon compounds selected from the group consisting of silanes and organic silicates; dialkyl ethers of dimethylol urea; heat reactive amino type reaction products; polyvalent metal oxides, halides and organic salts, alkyl sulfates, and polyesters of polyhydroxy compounds.

Among the useful polyepoxides in the present invention are organic monomeric or polymeric compounds having an epoxy equivalent greater than 1, and a minimum of two and suitable three or four and more epoxy groups per molecule.

These polyepoxides can be saturated, unsaturated, aliphatic, cycloaliphatic, aromatic, or heterocyclic and can be unsubstituted or substituted with, for example, hydroxyl groups, halogen atoms, ether radicals and the like. The polyepoxides useful in this invention have epoxy equivalent numbers, as defined in U.S. Patent 2,633,458, of at least 1.0.

Specific suitable polyepoxides are the epoxy polyethers of polyhydric phenols obtained by reacting a polyhydric phenol with a halogen-containing epoxide in an alkaline medium. Suitable for example, are the polyethers obtained by reacting an excess of epichlorohydrin with 2,2-bis(4-hydroxyphenyl)propane (to obtain 2,2-bis(2,3-epoxypropoxyphenyl)propane), resorcinol, catechol, hydroquinone, methyl resorcinol, polynuclear phenols such as 2,2-bis(4-hydroxyphenol) butane, 4,4'-dihydroxybenzophenone, bis(4-hydroxyphenyl) ethane, 2,2-bis(4-hydroxyphenyl) pentane, and 1,5-dihydroxynaphthalene. Typical halogen-containing epoxides are 3-chloro-1,2-epoxybutane, 3-bromo-1,2-epoxyhexane, 3-chloro-1,2-epoxyoctane, and the like.

Other polyepoxides are the glycidyl polyethers of dihydric phenols obtained by reacting an epihalohydrin e.g. epichlorohydrin and glycerol dichlorohydrin and a polyhydric phenol in an alkaline medium. The polymer product is generally not a single simple molecule but a mixture of glycidyl polyethers having the general formula

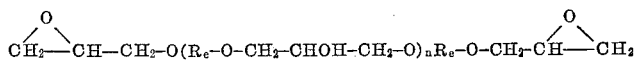

wherein $R_e$ is a divalent hydrocarbon radical of the dihydric phenol and $n$ is an integer of the series 0, 1, 2, 3, etc. The integer $n$ for the obtained mixture of polyethers is not necessarily zero or a whole number, but for any single molecule of the polyether, $n$ is an integer.

Among the suitable di- and polynuclear phenols suitable for preparation of the polyglycidyl ethers are the bisphenols described by Bender et al. in U.S. Patent No. 2,506,486 and polyphenols such as the novolac condensation product of a phenol and a saturated or unsaturated aldehyde containing on an average of from 3 to 20 or more phenylol groups per molecule (cf. book by T. S. Carswell entitled "Phenoplasts," published in 1947 by Interscience Publishers of New York). Examples of suitable polyphenols derived from a phenol and an unsaturated aldehyde, such as acrolein, are the triphenylols, pentaphenylols and heptaphenylols described in U.S. Patent No. 2,801,989 and U.S. Patent No. 2,885,385, both by A. G. Farnham. The polyhydric phenol can be mononuclear such as resorcinol or hydroquinone, or can be di- or polynuclear. The polyhydric polynuclear phenols can consist of two or more phenols connected by such groups as methylene, alkylene, ether, ketone or sulfone. The connecting groups are further exemplified by the following compounds: bis(p-hydroxyphenyl) ether, bis(p-hydroxyphenyl) ketone, bis(p-hydroxyphenyl) methane, bis(p-hydroxyphenyl) sulfone, or a trisphenol or a tetraphenol.

Other polyepoxides useful in the present invention are those obtainable by the epoxidation of olefinically unsaturated compounds e.g. bis(2-cyclopentenyl)ether, 4-vinylcyclohexene and dicyclopentadiene with e.g. peracetic acid or acetaldehyde monoperacetate to form bis(2,3-epoxycyclopentyl)ether, 4-vinylcyclohexene dioxide, and dicyclopentadiene dioxide, respectively.

Particularly preferred as the modifying agent is the diglycidyl ether of 2,2-bis(4-hydroxyphenyl)propane, the diglycidyl ether of 2,4-dihydroxyphenyl methane, the polyglycidyl ether of a 6-7 ring (average) phenol-formaldehyde novolac, and the diglycidyl polyether of 2,2-bis(4-hydroxyphenyl)propane, and 3,4-epoxy-6-methylcyclohexylmethyl 3,4-epoxy-6-methylcyclohexanecarboxylate.

Highly desirable compounds, among the silanes, have the formula

wherein X is a halogen group, i.e. fluoro, bromo, iodo and especially a chloro group and $R_s$ is a hydrocarbon group free of aliphatic unsaturation, such as an alkyl group, particularly having from 1 to 10 carbon atoms i.e. an ethyl group, or an aryl group e.g. phenyl or substituted phenyl and G is selected from the group consisting of halogens as named above, and hydrocarbon groups free of aliphatic unsaturation particularly alkyl groups and aryl or substituted aryl groups having from 1 to 10 carbon atoms.

Highly desirable silicates have the formula

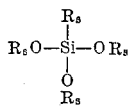

wherein each $R_s$ is the same or different from the others and is a hydrocarbon free of aliphatic unsaturation containing from 1 to 10 carbon atoms, inclusive.

Dialkyl ethers of dimethylol urea useful herein have the structure

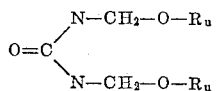

wherein each $R_u$ is an alkyl group containing from 1 to 10 and preferably from 1 to 4 carbon atoms, inclusive. The ether of dimethylol urea can be prepared as follows.

To 1500 grams of 37% Formalin there is added 500 grams of urea. The pH of the mixture is adjusted to 9.5 with 25% aqueous sodium hydroxide. The mixture is agitated with cooling to 20–25° C. for 22 hours. To the resulting precipitate of dimethylol urea there is added 2760 grams of ethanol (95%). The pH is adjusted to 2.8 with 20% sulfuric acid. After five minutes of agitation, the solution becomes clear. Agitation is continued for an hour. The pH is now adjusted to 7.6 with 25% aqueous sodium hydroxide. The precipitate of sodium sulfate which forms is removed by filtration. The filtrate is evaporated at 35–50° C. under reduced pressure to about 15% water content.

The heat reactive amino type reaction products include the hexamethyl ether of hexamethylol melamine, and alkylated melamine-formaldehyde, urea-formaldehyde or benzoguanamine-formaldehyde monomeric or polymeric reaction products wherein the alkyl group contains from 1 to 6 preferably 1 to 4 carbon atoms inclusive.

Among the metal salts useful herein there can be mentioned the halides, oxides and fatty salts of the polyvalent metals of Groups II-A, II-B, III-A, IV-B and VIII in the Deming periodic table, Handbook of Chemistry and Physics, Chemical Rubber Publishing Co., 30th ed. p. 312. Specific compounds include aluminum trichloride, zinc chloride, zinc oxide, and magnesium oxide, barium octoate, chromium octoate, nickel octoate, zinc salicylate, zirconium naphthenate, zinc acetyl acetonate, tetrabutyl titanate, and aluminum acetyl acetonate and the like.

Among the inorganic esters there can be mentioned the alkyl sulfates wherein the alkyl group contains from 1 to 6 carbon atoms, inclusive.

Other modifiers include the polyesters of polyhydroxy compounds e.g. diesters of glycols, such as the alkyl diesters of ethylene glycol, e.g. glycol diformate and glycol dipropionate, as well as the alkyl esters of polyglycols such as triglycol di-(2-ethyl hexanoate) and other alkyl esters of glycols as well as halogen substituted alkyl esters such as the dichloroformate esters of aliphatic dihydroxy compounds such as the glycols or aromatic dihydroxy compounds such as the dihydric phenols listed hereinbelow wherein the alkyl groups, which can be the same or different preferably contain from 1 to 10 carbon atoms inclusive.

The thermoplastic polyhydroxyethers in the present invention have, as above stated, the general formula

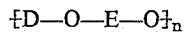

wherein D is the radical residuum of a dihydric phenol, E is a radical residuum of an epoxide selected from mono- and diepoxides and contains from 1 to 2 hydroxyl groups and $n$ is an integer which represents the degree of polymerization and is at lesat 30 and preferably is above about 80.

In general, thermoplastic polyhydroxyethers are prepared by contacting under polymerization conditions a dihydric phenol and an epoxide containing from 1 to 2 epoxide groups in substantially equimolar amounts. Ordinarily from 0.985 to 1.015 moles and preferably one mole of the epoxide is employed per mole of dihydric phenol. Polymerization occurs at room temperature (25° C.) and lower but only slowly, hence ordinarily, an elevated temperature e.g. 40°C. to 250° C. or more preferably from 80 to 125° C. is used to ensure a rapid rate of polymerization. Pressure is not at all critical, with polymerization being successfully effected at atmospheric, subatmospheric, or superatmospheric pressure with or without an inert gas such as nitrogen in the reaction vessel.

In particular, to prepare a polyhydroxyether from a dihydric phenol such as bisphenol-A and a monoepoxide such as epichlorohydrin, there is placed in a reaction vessel from 0.985 to 1.015 moles of the epichlorohydrin, preferably one mole, per mole of bisphenol-A together with about 0.6 to 1.4 moles, preferably from about 1.02 to 1.25 moles per mole of dihydric phenol of an alkali metal hydroxide such as sodium hydroxide, potassium hydroxide, lithium hydroxide and the like, added entirely initially or 5 to 50 percent added stepwise over the course of the reaction, generally in an aqueous medium and the mixture is heated at a temperature of about 10° C. to about 50° C. preferably from about 20° C. to about 40° C. to effect a coupling of the reactants, adjusting, if necessary, the amounts of alkali metal hydroxide in the reaction mixture so that the final concentration of alkali in the aqueous phase of the reaction mixture at the completion of the reaction is between about 0.1 and 1.2 molal, and preferably between about 0.3 and 0.6 molal, and heating the reaction mixture at a temperature of from about 60° C. to boiling or reflux or higher under pressure to obtain a polyhydroxyether having the desired molecular weight.

The product produced by the foregoing reaction between bisphenol-A and epichlorohydrin has the repeating unit

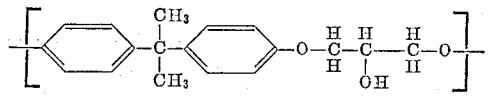

and can be termed a poly(monohydroxyether) of bisphenol-A.

To prepare a polyhydroxyether from a dihydric phenol such as hydroquinone and a diepoxide such as butadiene dioxide, there is placed in a reaction vessel from 0.985 to 1.015 moles of the butadiene dioxide per mole of hydroquinone, and the reactants are heated at a temperature from 10° C. to 250° C. particularly from 80 to 125° C. and, preferably at atmospheric reflux until there is obtained a polyhydroxyether of the desired molecular weight. Reaction under alkaline conditions is preferred. Pressure is not critical and reaction can be successfully effected at atmospheric, sub-atmospheric, or superatmospheric pressure with or without an inert gas such as nitrogen in the reaction vessel. It is not necessary, but it is generally desirable to employ an acidic or acid accepting compound as a catalyst for the reaction. Numerous compounds can be used and in catalytic amounts e.g. from 0.00005 to 3 percent and higher by weight based on the dihydric phenol. Among others there can be mentioned the hydroxides and alkoxides of the alkali metals, such as sodium, potassium and lithium hydroxides and sodium ethoxide; tertiary amines such as tribenzyl amine, as well as quaternary ammonium salts. Other suitable catalysts include the Lewis acids, and Friedel-Crafts catalysts, such as metal halides, e.g. zinc chloride, boron trifluoride and aluminum bromide as well as other acidic compounds.

The product produced by the foregoing reaction between hydroquinone and butadiene dioxide has the repeating unit

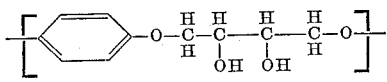

and can be termed a poly(dihydroxyether) of hydroquinine.

By the use of both a monoepoxide and a diepoxide poly(hydroxy-dihydroxyethers) can be obtained, the relative amounts of mono- and diepoxide determining the final concentration of the mono- and dihydroxy containing repeating units E in the polymer.

Poly(hydroxydihydroxyethers) are prepared in the same manner as polydihydroxyethers except that there is additionally employed from 0.6 to 1.5 moles of alkali metal hydroxide per mole of dihydric phenol e.g. lithium, sodium or potassium hydroxide.

The dihydric phenol and epoxide can be contacted while fluid, i.e., while in solution or in the melt. Solution reaction is preferred for best heat transfer and highest degree of control over the reaction. Suitable solvents include, among others, hydroxylic solvents, e.g. water, methanol, ethanol, propanol-2, and n-butanol, ethers e.g. dioxane, diethyl ether, dibutyl ether, diphenyl ether, dimethyl ether of ethylene glycol, and dimethyl ether of diethylene glycol; esters e.g. ethyl acetate and propyl acetate; aromatic and aliphatic ketones, e.g. acetophenone, benzophenone, acetone, methyl ethyl ketone and methyl isobutyl ketone; aromatic hydrocarbons e.g. benzene, toluene, o, m and p-xylene; halogenated aromatic hydrocarbons e.g. carbon tetrachloride, methylene chloride and 1,1,2,2-tetrachloroethane, amides e.g. dimethylformamide and dimethyl acetamide; aliphatic hydrocarbons such as n-hexane, n-heptane and the like; cycloaliphatic hydrocarbons such as cyclohexane, n-propyl cyclohexane and the like; and sulfoxides, e.g. dimethyl sulfoxide.

Polyhydroxyethers are high molecular weight, stable thermoplastic polymers which can be thermoformed into various useful contours such as films, fibers, molded articles and the like. Films of polyhydroxyethers are of special interest since they are flexible, clear and colorless, have good oxygen and water vapor barrier properties, and exhibit surprisingly high adhesiveness to numerous substrates. Articles molded of polydihydroxyethers such as dishpans and bottles are strong and tough, exhibiting high values in tensile modulus, tensile strength, elongation and pendulum impact.

The polyhydroxyethers herein taught are, as stated, thermoplastic in nature and are, therefore, to be sharply distinguished from thermosetting, curable "epoxy" resins now known which, accordingly to U.S. Patent 2,503,726 to Greenlee, for example, can be prepared by the reaction of dihydric phenols e.g. bisphenol-A, and polyepoxy compounds such as butylene dioxide (butadiene dioxide) and which can be represented by the formula

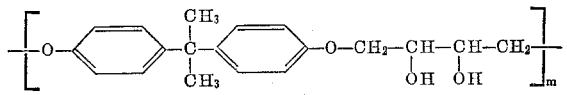

wherein $m$ is an integer from 2 to about 20 as a miximum. These low molecular weight epoxy resins are brittle and friable and do not possess adequate toughness for typical plastics applications unless reacted with ohter materials and converted to the thermoset state. They are, therefore, of no utility in injection molding applications and in formation of thin self-sustaining films.

Somewhat high molecular weight resins, which are obtained by reacting a dihydric phenol with epichlorohydrin, have apparently been disclosed by Carpenter et al. in U.S. Patent 2,602,075 issued July 1, 1952.

Any dihydric phenol can be used in forming polyhydroxyethers. Illustrative dihydric phenols are mononuclear dihydric phenols such as hydroquinone, resorcinol, and the like as well as the polynuclear phenols which are preferred. The dihydric polynuclear phenols have the general formula:

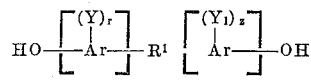

wherein: Ar is an aromatic divalent hydrocarbon radical such as naphthylene and phenylene with phenylene being preferred for the thermoplastic polyhydroxyethers used in this invention; $Y$ and $Y_1$, which can be the same or different are alkyl radicals such as methyl, n-propyl, n-butyl, n-hexyl, n-octyl and the like, preferably alkyl radicals having a maximum of 4 carbon atoms; or halogen atoms, i.e., chlorine, bromine, iodine, or fluorine; or alkoxy radicals such as methoxy, methoxymethyl, ethoxy, ethoxyethyl, n-butyloxy, amyloxy and the like, preferably an alkoxy radical having a maximum of 4 carbon atoms. It is to be understood that whenever there are substituents, exclusive of the hydroxy groups on either or both of the armoatic divalent hydrocarbon groups, these substituents can be the same or different; $r$ and $z$ are integers having a value of from 0 to a miximum value corresponding to the number of hydrogen atoms on the aromatic ring (Ar) which can be replaced by substituents and can have the same or different values; and $R^1$ is a bond between adjacent carbon atoms as in dihydroxydiphenyl or is a divalent radical, for example,

or —O—, or —S—, or —SO$_2$—, or —S—S—, or a divalent hydrocarbon radical as for example an alkylene radical such as methylene, ethylene, trimethylene, tetramethylene, pentamethylene, hexamethylene, 2-ethyl hexamethylene, octamethylene, nonamethylene, decamethylene, and the like; an alkylidene radical such as ethylidene, propylidene, isopropylidene, isobutylidene, amylidene, isoamylidene, 1-phenyl ethylidene and the like, or a cycloaliphatic radical, such as 1,4-cyclohexylene, 1,3-cyclohexylene, cyclohexylidene, and the like, or halogenated alkylidene, alkylene, or cycloaliphatic radicals, alkoxy and aryloxy substituted alkylidene, alkylene or cycloaliphatic radicals, such as methoxy methylene, ethoxy methylene, ethoxy ethylene, 2-ethoxy trimethylene, 3-ethoxy-2-phenoxy trimethylene, 1,3-(2-phenoxy cyclohexane), and the like, aralkylene radicals, such as phenyl ethylene, 2-phenyl trimethylene, 1-phenyl pentamethylene, 2-phenyl decamethylene, and the like, aromatic radicals, such as phenylene, naphthylene, and the like, halogenated aromatic radicals, such as 1,4(2-chlorophenylene), 1,4-(2-bromophenylene), 1,4-(2-fluorophenylene), and the like; alkoxy and aryloxy substituted aromatic radicals, such as 1,4-(2-n-propoxyphenylene), 1,4-(2 - phenoxyphenylene), and the like, alkyl substituted aromatic radicals, such as 1,4-(2-methylphenylene), 1,4-(2-ethylphenylene), 1,4-(2-n-propylphenylene), 1,4-(2-n-butylphenylene), 1,4-(2-n-dodecylphenylene) and the like; or $R^1$ can be a ring which is fused to one of the Ar groups as is the case, for example, in the compound having the formula:

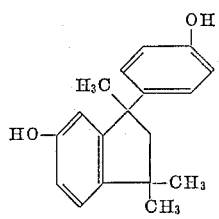

or $R^1$ can be a polyalkoxy radical such as polyethoxy, polypropoxy, polythioethoxy, polybutoxy, polyphenylethoxy; or $R^1$ can be a radical containing a silicon atom as, for example polydimethylsiloxy, polydiphenylsiloxy, polymethylphenylsiloxy and the like; or $R^1$ can be two or more alkylidene radicals separated by an aromatic ring, a tertiary amino group, an ether linkage, a carbonyl group or separated by a linkage containing sulfur such as sulfide, sulfoxide and the like.

Particularly preferred are dihydric polynuclear phenols having the general formula:

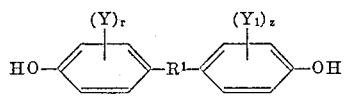

wherein Y, $Y_1$, are as previously defined, $r$ and $z$ have values of from 0 to 4 inclusive and $R^1$ is an alkylene or alkylidene group, preferably having from 1 to 3 carbon atoms inclusive or $R^1$ is a saturated group such as is obtained from compounds such as vinylcyclohexene and dipentene or its isomers by reaction with two moles of phenol per mole of the compound. $R^1$ preferably contains from 1 to 9 carbon atoms.

Thermoplastic polyhydroxyethers produced using the dihydric polynuclear phenols described in the preceding paragraph have extremely good mechanical properties. In addition, polyhydroxyethers produced using a dihydric polynuclear phenol wherein $R^1$ is the saturated group from vinylcyclohexene or dipentene or its isomers have heat distortion temperatures which are relatively high.

Examples of other specific dihydric phenols include among others:

The bis-(hydroxyphenyl)-alkanes such as
2,2-bis-(4-hydroxyphenyl)-propane,
2,4'-dihydroxy diphenylmethane, bis-(2-hydroxypheyl)-methane,
bis-(4-hydroxyphenyl)-methane,
bis-(4-hydroxy-2,6-dimethyl-3-methoxyphenyl)-methane,
1,1-bis-(4-hydroxyphenyl)-ethane,
1,2-bis(4-hydroxyphenyl)-ethane,
1,1-bis-(4-hydroxy-2-chlorophenyl)-ethane,
1,1-bis-(3-dimethyl-4-hydroxyphenyl)-ethane,
1,3-bis(3-methyl-4-hydroxyphenyl)-propane,
2,2-bis(3-phenyl-4-hydroxyphenyl)-4-propane,
2,2-bis-(3-isopropyl-4-hydroxyphenyl)-propane,
2,2-bis-(2-isopropyl-4-hydroxyphenyl)-propane,
2,2-bis-(4-hydroxynaphthyl)propane,
2,2-bis-(4-hydroxyphenyl)-pentane,
3,3-bis-(4-hydroxyphenyl)-pentane,
2,2-bis-(4-hydroxyphenyl)-heptane,
bis-(4-hydroxyphenyl)-phenylmethane,
bis-(4-hydroxyphenyl)-cyclohexylmethane,
1,2-bis-(4-hydroxyphenyl)-1,2-bis-(phenyl)-propane,
2,2-bis-(4-hydroxyphenyl)-1-phenyl-propane and the like;

di(Hydroxyphenyl)sulfones such as
bis-(4-hydroxyphenyl)-sulfone,
2,4'-dihydroxydiphenyl sulfone,
5'-chloro-2,4'-dihydroxydiphenyl sulfone,
5'-chloro-4,4'-dihydroxydiphenyl sulfone, and the like;

di(Hydroxyphenyl)ethers such as
bis-(4-hydroxyphenyl)-ether the 4,3'-, 4,2'-, 2,2'-, 2,3'-dihydroxydiphenyl ethers,
4,4'-dihydroxy-2,6-dimethyldiphenyl ether,
bis-(4-hydroxy-3-isobutylphenyl)-ether,
bis-(4-hydroxy-3-isopropylphenyl)-ether,
bis-(4-hydroxy-3-chlorophenyl)-ether,
bis-(4-hydroxy-3-fluorophenyl)-ether,
bis-(4-hydroxy-3-bromophenyl)-ether,
bis-(4-hydroxynapthyl)-ether,
bis-(4-hydroxy-3-chloronaphthyl)-ether,
bis-(2-hydroxydiphenyl)-ether,
4,4'-dihydroxy-2,6-dimethoxy-diphenyl ether,
4,4'-dihydroxy-2,5-diethoxydiphenyl ether, and the like.

Also suitable are the bisphenol reaction products of 4-vinylcyclohexene and phenols, e.g. 1,3-bis(p-hydroxyphenyl)-1, ethylcyclohexame, and the bisphenol reaction products of dipentene or its isomers and phenols as well as 1,3,3-trimethyl-1-(4-hydroxyphenyl)-6-hydroxyindane, and 2,4-bis(4-hydroxyphenyl)-4-methylpentane, and the like.

Mixtures of dihydric phenols can also be employed and wherever the term "dihydric phenol" or "dihydric polynuclear phenol" is used herein, mixtures of these compounds are intended to be included.

The dihydric phenols which are used are substantially free of higher functional phenolic compounds, that is, phenols containing three of more phenolic hydroxyl groups, such as trihydric phenols or trisphenols. In general, the dihydric polynuclear phenols used should contain less than about 1.5 mole percent and preferably less than about 0.5 mole percent, based on the moles of dihydric polynuclear phenol, of such higher functional phenols.

The concentration of the higher functional phenolic compounds in the dihydric phenols can be readily measured by conventional chromatographic techniques such as described by W. M. Anderson, G. B. Carter and A. J. Landua in Analytical Chemistry 31, 1214 (1959) and if necessary, the dihydric phenol can be purified by recrystallization from a suitable solvent such as toluene.

More than about 1.5 mole percent of a higher functional phenolic compond can be tolerated in the dihydric phenols provided that an equivalent amount of a monohydric phenol is added in order to offset the increased functionality of the resultant system.

If desired, monohydric phenols can be added to the reaction mixture containing the dihydric phenol and the diepoxide at the start of the reaction or at any other convenient time during the course of the reaction. The monohydric phenols serve to regulate the molecular weight of the polydihydroxyether by acting as a chain terminator. When used as chain terminator, the monohydric phenols are used in amounts of from about 0.01 mole to about 0.05 mole, preferably about 0.01 mole to about 0.02 mole per mole of the dihydric phenol. This amount is in addition to the amount of monohydric phenol used for purposes of offsetting the presence of higher functional phenolic compounds as explained in the preceding paragraph. Illustrative of suitable monohydric phenols are the following: phenol, alkylated monohydric phenols such as m-cresol, ethyl phenol, p-tertiary butylphenol and the like; alkoxy monohydric phenols such as m-methoxyphenol, m-ethoxyphenol and the like; halogenated monohydric phenols such as m-chlorophenol, m-bromophenol and the like, and p-phenylphenol and the like.

Diepoxides useful for the preparation of polyhydroxyethers can be represented by the formula

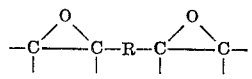

wherein R is representative of a bond between adjacent carbon atoms or a divalent inorganic or organic radical such as an aliphatic, aromatic, homocyclic, heterocyclic or acyclic arrangement of atoms.

By the term "diepoxide" is meant a compound containing two epoxide groups i.e. groups containing an oxirane oxygen atom bonded to two vicinal aliphatic carbon atoms. Saturated diepoxides in which both the oxirane oxygen atoms are bonded to carbon atoms of a saturated aliphatic hydrocarbon chain are particularly preferred. The term "saturated diepoxides" refers to diepoxides which are free of ethylenic unsaturation, i.e. >C=C<, and acetylenic unsaturation, i.e. —C≡C—. Diepoxides which contain solely carbon, hydrogen and oxygen atoms are especially preferred. The oxygen atoms can be (in addition to oxirane oxygen), ether oxygen, i.e. —O—; oxacarbonyl oxygen, i.e.,

carbonyl oxygen, i.e.

and the like. A single diepoxide or a mixture of at least two diepoxides can be employed in preparing the polydihydroxyethers of the present invention and the term "diepoxide" is intended to include a mixture of at least two diepoxides.

Illustrative diepoxides include, for example, the alkanediol bis(3,4 - epoxycyclohexanecarboxylates), the alkenediol bis(3,4 - epoxycyclohexanecarboxylates), the alkanediol bis(lower alkyl substituted - 3,4 - epoxycyclohexanecarboxylates), the oxaalkanediol bis(lower alkyl substituted - 3,4 - epoxycyclohexanecarboxylates), the oxaalkanediol bis(lower alkyl substituted - 3,4 - epoxycyclohexanecarbonates), and the like. Specific compounds which can be mentioned are:

Diethylene glycol bis(3,4-epoxycyclohexanecarboxylate),
2-ethyl-1,3-hexanediol bis(3,4-epoxycyclohexanecarboxylate),
diethylene glycol bis(3,4-epoxy-6-methylcyclohexanecarboxylate),
3-methyl-1,5-pentanediol bis(3,4-epoxycyclohexanecarboxylate),
3-methyl-1,5-pentanediol-bis(3,4-epoxy-2 or 3 or 4 methylcyclohexanecarboxylate),
triethylene glycol bis(3,4-epoxycyclohexanecarboxylate),
1,5-pentanediol bis(3,4-epoxycyclohexanecarboxylate),
2-methoxymethyl-4-dimethyl-1,5 pentanediol bis(3,4-epoxycyclohexanecarboxylate),
ethylene glycol bis(3,4-epoxycyclohexanecarboxylate),
ethylene glycol bis(3,4-epoxy-6-methylcyclohexanecarboxylate),
2-ethylhexane-1,3-diol glutarate 3,4-epoxycyclohexanecarboxylate,
"Carbowax 400" bis(6-methyl-3,4-epoxycyclohexanecarboxylate),
"Carbowax 1000" bis(6-methyl-3,4-epoxycyclohexanecarboxylate),
"Polypropylene glycol 2025" bis(6-methyl-3,4-epoxycyclohexanecarboxylate),
2-ethylhexane-1,3-bis(6-methyl-3,4-epoxycyclohexanecarboxylate),
2,2'-sulfonyldiethanol bis-(3,4-epoxycyclohexanecarboxylate),
2,2-diethyl-1,3-propanediol bis(3,4-epoxycyclohexanecarboxylate),
1,6-hexanediol bis(3,4-epoxycyclohexanecarboxylate).

The diol poly(3,4-epoxycyclohexanecarboxylates) abovementioned can be prepared by epoxidizing the corresponding diol poly(cyclohexanecarboxylate) with at least a stoichiometric quantity of peracetic acid (preferably as a solution in ethyl acetate) per carbon to carbon double bond of said diol poly(cyclohexanecarboxylate), at a temperature in the range of from about 25° to 90° C., for a period of time sufficient to introduce oxirane oxygen at the sites of the carbon to carbon double bonds contained in the diol poly(cyclohexenecarboxylate) reagent. The diol poly(cyclohexenecarboxylates), in turn, can be prepared in accordance with well known condensation techniques, e.g., the esterification of a polyol, e.g., ethylene glycol, diethylene glycol, triethylene glycol, tetraethylene glycol, 1,2-propylene glycol, 1,3-propylene glycol, the polyoxyethylene glycols, 1,4-butanediol, 1,5-pentanediol, 1,6-hexanediol, the octanediols, the octadecanediols, the butenediols, the pentenediols, the hexenediols, the octenediols, and the like; with a 3-cyclohexenecarboxylic acid, e.g., 3-cyclohexenecarboxylic acid, lower alkyl substituted - 3 - cyclohexenecarboxylic acid, and the like. The expression "lower alkyl," as used in disclosure, means and alkyl radical which contains from 1 to 4 carbon atoms.

Other diepoxides contemplated include, for instance, the bis(3,4-epoxycyclohexylmethyl) hydrocarbon dicarboxylates and the bis(lower alkyl substituted-3,4-epoxycyclohexylmethyl)hydrocarbon dicarboxylates, e.g., bis(3,4-epoxycyclohexylmethyl) oxalate,
bis(3,4-epoxycyclohexylmethyl) malonate,
bis(3,4-epoxycyclohexylmethyl) succinate,
bis(3,4-epoxycyclohexylmethyl) glutarate,
bis(3,4-epoxycyclohexylmethyl) adipate,
bis(3,4-epoxycyclohexylmethyl) maleate,
bis(3,4-epoxycyclohexylmethyl) tetrahydrophthalate,
bis(3,4-epoxycyclohexylmethyl) citraconate,
bis(3,4-epoxycyclohexylmethyl) isocitraconate,
bis(3,4-epoxy-6-methylcyclohexylmethyl) fumarate,
bis(3,4-epoxycyclohexylmethyl) pimelate,
bis(3,4-epoxycyclohexylmethyl) terephthalate,
bis(3,4-epoxycyclohexylmethyl) azelate,
bis(3,4-epoxycyclohexylmethyl) sebacate,
bis(3,4-epoxycyclohexylmethyl) itaconate,
bis(3,4-epoxycyclohexylmethyl) hexahydrophthalate,
bis(3,4-epoxycyclohexylmethyl) phthalate,
bis(3,4-epoxycyclohexylmethyl) glutaconate,
bis(3,4-epoxycyclohexylmethyl) hydromuconate, and the like, including the bis (3,4 - epoxy-6-methylcyclohexylmethyl) hydrocarbon dicarboxylates such as bis (3,4 - epoxy - 6 - methylcyclohexylmethyl) adipate, bis(3,4 - epoxy - 6 - methylcyclohexylmethyl) succinate, and bis(3,4 - epoxy - 6 - methylcyclohexylmethyl) sebecate and the like, as well as di(3,4 - epoxycyclohexylmethyl) - 2 - ethylhexyl - 1,2,4 - butane tricarboxylate.

Other desirable diepoxides include the monoesters of 3,4-epoxycyclohexylmethanols and 3,4-epoxycyclohexanecarboxylic acids such, for example, 3,4-epoxycyclohexylmethyl 3,4-epoxycyclohexanecarboxylate,
1-methyl-3,4-epoxycyclohexylmethyl 1-methyl-3,4-epoxycyclohexanecarboxylate,
6-methyl-3,4-epoxycyclohexylmethyl 6-methyl-3,4-epoxycyclohexanecarboxylate,
2-ethyl-3,4-epoxyclclohexylmethyl 2-ethyl-3,4-epoxycyclohexanecarboxylate,
3,4-epoxy-(3 or 4)-methylcyclohexylmethyl-3,4-epoxy (3 or 4)-methylcyclohexanecarboxylate,
4-n-propyl-3,4-epoxycyclohexylmethyl 4-n-propyl-3,4-epoxycyclohexanecarboxylate,
5-isobutyl-3,4-epoxycyclohexylmethyl 5-isobutyl-3,4-epoxycyclohexanecarboxylate,
9,10-epoxyoctadecyl-6-methyl-3,4-epoxycyclohexanecarboxylate,
lower alkyl substituted-3,4-epoxycyclohexylmethyl lower alkyl substituted-3,4-epoxycyclohexanecarboxylate,
halo substituted-3,4-epoxycyclohexylmethyl halo substituted-3,4-epoxycyclohexanecarboxylate,
1-chloro-3,4-epoxycyclohexylmethyl 1-chloro-3,4-epoxycyclohexanecarboxylate,
2-bromo-3,4-epoxycyclohexylmethyl 2-bromo-3,4-epoxycyclohexanecarboxylate, and the like.

Other diepoxides include ethers wherein the oxirane oxygens are connected in epoxy groups wherein the carbon atoms are a part of a branched or straight chain aliphatic hydrocarbon such as bis(2,3-epoxy-2-ethylhexyl) ether, diglycidyl ether, diglycidyl Cellosolve, bis(2,3-epoxybutyl)ether, bis(2,3-epoxy-2-methylpropoxy) ethane, 2,3-epoxybutyl-2-methylglycidyl ether, di(2-methylglycidyl)Carbitol, bis(2-neopentylglycidyl)-ether, glycidyl-(2,3-epoxypropoxy)propionate, bis(2,3-epoxy-5,5,7,7-tetramethyloctyl) ether, α,α′-diglycidyloxypara-xylene, bis(glycidyl Cellosolve) maleate, and the like.

Other diepoxides which can be mentioned include those wherein the two oxirane groups are linked through an aromatic ether i.e. compounds having the grouping

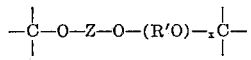

wherein R′ is a divalent organic radial, Z is a divalent aromatic radical residuum of a dihydric phenol such as those listed above in the description of dihydric phenols, and $x$ is an integer from 0 to 1 inclusive.

Still other diepoxides include ethers wherein the oxirane groups are connected to vicinal carbon atoms at least one pair of which is a part of a cycloaliphatic hydrocarbon. Among others there can be mentioned:

bis(2-3-epoxycyclopentyl)ether,
4(2,3-epoxybutoxy)-9-oxatetracyclo[4.4.1$^{2,4}$.0$^{1,6}$.0$^{8,10}$] undecane,
2,3-epoxycyclopentyl-2-methylglycidyl ether,
1,4-butanediol bis(3,4-epoxycyclohexylmethyl)ether,
1,4-butanediol bis(1-methyl-3,4-epoxycyclohexylmethyl) ether,
1,5-pentanediol bis(6-methyl-3,4-epoxycyclohexylmethyl)ether,
p-xylene-α,α′-bis(6-methyl-3,4-epoxycyclohexylmethyl)ether,
bis(6-methyl-3,4-epoxycyclohexylmethyl)ether,
ethylene glycol bis(3-oxatetracyclo[4.4.1$^{7,10}$.0$^{1,6}$.0$^{2,4}$] undecyl-8-ether),
bis(3-oxatetracyclo[4.4.1$^{7,10}$.0$^{1,6}$.0$^{2,4}$]undecyl-8-ether),
3,4-epoxycyclohexylmethyl-6-methyl-3,4-epoxycyclohexylmethyl-ether,
6-oxabicylo[3.1.0]hexan-2-yl-9-oxatetracyclo [5.3.1.0$^{2,6}$.0$^{8,10}$]undecan-3-yl ether,
bis[9-oxatetracyclo [5.3.1.0$^{2,6}$.0$^{8,10}$]undecan-3-yl ether,
bis(3-oxatetracyclo[4.4.0.1$^{7,10}$.0$^{2,4}$]undec-8-yl)ether; and the like.

Additional diepoxides include, bis(2,3-epoxy-2-ethylhexyl)adipate,
2,3-epoxy-2-methylpentyl 3,4-epoxycyclohexane carboxylate,
bis(2,3-epoxy-2-methylpropyl)succinate,
bis(2,3-epoxy-2-ethylhexyl)pimelate,
ethylene glycol bis(2,3-epoxybutyrate,
bis(2,3-epoxy-2-ethylhexyl)phthalate,
2-ethyl-1,3-hexanediol-2-ethyl-2,3-epoxyhexyl adipate polyester,
bis(2-methyl-2,3-epoxyamyl) pimelate.

Further diepoxides are contemplated, for example, bis (9,10-epoxyoctadecyl) phthalate, diglycidyl maleate, diglycidyl succinate, diglycidyl phthalate, di(2-methylglycidyl)hexahydrophthalate, alkyl diglycidyl - 1,2,4-butane tricarboxylate, dipropylene glycol bis(2-ethylhexyl-4,5-epoxycyclohexane-1,2-dicarboxylate), and the like.

Still other desirable epoxides include, by way of illustration, the 3-oxatetracyclo[4.4.0.1$^{7,10}$.0$^{2,4}$]undec-8-yl vicinal-epoxyalkyl ethers,
the 3-oxatetracyclo[4.4.0.1$^{7,10}$.0$^{2,4}$]undec-8-yl vicinal-epoxycycloalkyl ethers,
the 3-oxatetracyclo[4.4.0.1$^{7,10}$.0$^{2,4}$]undec-8-yl vicinal-epoxycycloalkylalkyl ethers,
the 3-oxatetracyclo[4.4.0.1$^{7,10}$.0$^{2,4}$]undec-8-yl 3-oxatricyclo[3.2.1.0$^{2,4}$]oct-6-yl ethers,
the 3-oxatetracyclo[4.4.0.1$^{7,10}$.0$^{2,4}$]undec-8-yl 3-oxatricyclo[3.2.1.0$^{2,4}$]oct-6-ylalkyl ethers, and the like.

Specific examples include 3-oxatetracyclo[4.4.0.1$^{7,10}$.0$^{2,4}$]undec-8-yl 2,3-epoxypropyl ether,
3-oxatetracyclo[4.4.0.1$^{7,10}$.0$^{2,4}$]undec-8-yl 3,4-epoxybutyl ether,
3-oxatetracyclo[4.4.0.1$^{7,10}$.0$^{2,4}$]undec-8-yl 2,3-epoxybutyl ether,
3-oxatetracyclo[4.4.0.1$^{7,10}$.0$^{2,4}$]undec-8-yl 3,4-epoxyhexyl ether,
3-oxatetracyclo[4.4.0.1$^{7,10}$.0$^{2,4}$]undec-8-yl 5,6-epoxyhexyl ether,
3-oxatetracyclo[4.4.0.1$^{7,10}$.0$^{2,4}$]undec-8-yl 7,8-epoxyoctyl ether,
3-oxatetracyclo[4.4.0.1$^{7,10}$.0$^{2,4}$]undec-8-yl 2-methyl-2,3-epoxypropyl ether,
3-oxatetracyclo[4.4.0.1$^{7,10}$.0$^{2,4}$]undec-8-yl 2-ethyl-2,3-epoxyhexyl ether,
3-oxatetracyclo[4.4.0.1$^{7,10}$.0$^{2,4}$]undec-8-yl 9,10-epoxystearyl ether,
3-oxatetracyclo[4.4.0.1$^{7,10}$.0$^{2,4}$]undec-8-yl 9,10,12,13-diepoxystearyl ether,
3-oxatetracyclo[4.4.0.1$^{7,10}$.0$^{2,4}$]undec-8-yl 2,3-epoxycyclopentyl ether,
3-oxatetracyclo[4.4.0.1$^{7,10}$.0$^{2,4}$]undec-8-yl 2,3-epoxycyclopentylmethyl ether,
3-oxatetracyclo[4.4.0.1$^{7,10}$.0$^{2,4}$]undec-8-yl alkyl substituted 3,4-epoxycyclohexyl ether,
3-oxatetracyclo[4.4.0.1$^{7,10}$.0$^{2,4}$]undec-8-yl 3,4-epoxycyclohexyl ether,
3-oxatetracyclo[4.4.0.1$^{7,10}$.0$^{2,4}$]undec-8-yl 2,3-epoxycyclohexyl ether,
3-oxatetracyclo[4.4.0.1$^{7,10}$.0$^{2,4}$]undec-8-yl 3,4-epoxycyclohexylmethyl ether,
3-oxatetracyclo[4.4.0.1$^{7,10}$.0$^{2,4}$]undec-8-yl 6-methyl-3,4-epoxycyclohexylmethyl ether,
3-oxatetracyclo[4.4.0.1$^{7,10}$.0$^{2,4}$]undec-8-yl 5-methyl-3,4-epoxycyclohexylmethyl ether,
3-oxatetracyclo[4.4.0.1$^{7,10}$.0$^{2,4}$]undec-8-yl alkyl substituted 3-oxatricyclo[3.2.1.0$^{2,4}$]oct-6-yl ether,
3-oxatetracyclo[4.4.0.1$^{7,10}$.0$^{2,4}$]undec-8-yl 3-oxatricyclo [3.2.1.0$^{2,4}$]oct-6-yl ether, and the like.

Other diepoxides contemplated include, for example, the bis(vicinal-epoxyalkyl) sulfones,
bis(vicinal-epoxyalkylalkoxy) sulfones,
bis(vicinal-epoxycycloalkyl) sulfones,
the bis(vicinal-epoxycycloalkylalkyl) sulfones,
the vicinal-epoxyalkyl 3-oxatetracyclo[4.4.0.1$^{7,10}$.0$^{2,4}$] undec-8-yl sulfones, and the like.

Examples of these diepoxy sulfones include bis(2,3-epoxycyclopentyl) sulfone,
bis(2-ethyl-2,3-epoxycyclopentyl) sulfone,
bis(4-n-butyl-2,3-epoxycyclopentyl) sulfone,
bis(3,4-epoxycyclohexyl) sulfone,
bis(lower alkyl substituted 3,4-epoxycyclohexyl) sulfone,
bis(2-methyl-3,4-epoxycyclohexyl) sulfone,
bis(5-isopropyl-3,4-epoxycyclohexyl) sulfone,
bis(3,4-epoxycycloheptyl) sulfone,
bis(lower alkyl substituted 3,4-epoxycycloheptyl) sulfone,
bis(2,3-epoxycyclopentylalkyl) sulfone,
bis(2,3-epoxycyclopentylmethyl) sulfone,
bis(2,3-epoxycyclopentylpropyl) sulfone,
bis(3,4-epoxycyclohexylalkyl) sulfone,
bis(3,4-epoxycyclohexylmethyl) sulfone,
bis(3,4-epoxycyclohexylbutyl) sulfone,
bis(3,4-epoxycycloheptylalkyl) sulfone,
bis(3,4-epoxycycloheptylmethyl) sulfone, bis(3-oxatricyclo[3.2.1.0$^{2,4}$]oct-6-yl) sulfone,
bis(3-oxatetracyclo[4.4.0.1$^{7,10}$.0$^{2,4}$]undec-8-yl) sulfone,
2,3-epoxypropyl 2,3-epoxycyclopentyl sulfone,
2-methyl-2,3-epoxypropyl 2,3-epoxycyclopentylmethyl sulfone,
10,11-epoxyoctadecyl 3,4-epoxycyclohexyl sulfone,
2-methyl-2,3-epoxyhexyl 3-oxatricyclo-[3.2.1.0$^{2,4}$] oct-6-yl sulfone,
2,3-epoxycyclopentyl 3-oxatetracyclo[4.4.0.1$^{7,10}$.0$^{2,4}$] undec-8-yl sulfone,
2-methyl-3,4-epoxycyclohexyl 2,3-epoxycyclopentylethyl sulfone,
3,4-epoxypentyl 2-n-butyl-3,4-epoxycyclohexyl sulfone, and the like.

Still other diepoxides contemplated include, for example, bis(vicinal-epoxyhexoxyalkyl) sulfone,
bis(loweralkylsubstituted-vicinal-epoxyhexoxyalkyl) sulfone,
bis(vicinal-epoxycyclohexoxyalkyl) sulfone,
bis(lower alkyl substituted-vicinal-epoxycyclohexoxyalkyl) sulfone,
bis(vicinal-epoxycyclohexylalkoxyalkyl) sulfone,
bis(lower alkyl substituted-3-oxatricyclo[3.2.1.0$^{2,4}$]-6-octoxyalkyl) sulfone,
bis(3-oxatetracyclo[4.4.0.1$^{7,10}$.0$^{2,4}$]-8-undecoxyalkyl) sulfone,
vicinal-epoxyalkoxyalkyl 3-oxatricyclo[3.2.1.0$^{2,4}$]-6-octoxyalkyl sulfone,
vicinal-epoxycyclohexoxyalkyl 3-oxatetracyclo-[4.4.0.1$^{7,10}$.0$^{2,4}$]-8-undecoxyalkyl sulfone,
and the like.

Specific examples of the preceding diepoxy diether sulfones include, among others, bis(3,4-epoxyhexoxypropyl) sulfone,
bis(2,5-dimethyl-3,4-epoxyhexoxypropyl) sulfone,
bis(3,4-epoxycyclohexoxypropyl) sulfone,
bis(2-methyl-3,4-epoxycyclohexoxyethyl) sulfone,
bis(2,5-dimethyl-3,4-epoxycyclohexoxypropyl) sulfone,
bis(2,3-epoxycyclohexylmethoxyethyl) sulfone,
bis(3,4-epoxycyclohexylethoxypropyl) sulfone,
bis(lower alkyl substituted-3,4-epoxycyclohexylmethoxypropyl) sulfone,
bis(3-oxatricyclo[3.2.1.0$^{2,4}$]-6-octoxyethyl) sulfone,
bis(3-oxatetracyclo[4.4.0.1$^{7,10}$.0$^{2,4}$]-8-undecoxypropyl) sulfone,
2,3-epoxypropoxyethyl 3-oxatricyclo[3.2.1.0$^{2,4}$]-6-octoxypropyl sulfone,
2-ethyl-2,3-epoxyhexoxypropyl 3,4-epoxycyclohexoxyethyl sulfone,
9,10-epoxyoctadecoxypropyl 2-methyl-3,4-epoxycyclohexoxyethyl sulfone,
bis(ethyl substituted-3-oxatetracyclo[4.4.0.1$^{7,10}$.0$^{2,4}$]-8-undecoxyethyl) sulfone,
bis(dimethyl substituted-3-oxatetracyclo[4.4.0.1$^{7,10}$.0$^{2,4}$]-8-undecoxyethyl) sulfone,
bis(lower alkyl substituted-3-oxatetracyclo-[4.4.0.1$^{7,10}$.0$^{2,4}$]-8-undecoxyethyl) sulfone,
and the like.

Additional diepoxides contemplated include, for example, omega,omega'-sulfonyldialkyl bis(vicinal-epoxycycloalkenecarboxylate), omega,omega'-sulfonyldialkyl bis(vicinal-epoxycycloalkylalkanoate), omega,omega'-sulfonyldialkyl bis(3-oxatricyclo[3.2.1.0$^{2,4}$]octane-6-carboxylate), and the like. Illustrative examples of the above-mentioned diepoxy diester sulfones are 2,2'-sulfonyldiethyl bis(2,3-epoxycyclopentanecarboxylate),
4,4'-sulfonyldibutyl bis(3,4-epoxycyclohexanecarboxylate),
3,3'-sulfonyldipropyl bis(3,4-epoxycycloheptanecarboxylate),
2,2'-sulfonyldiethyl bis(2,3-epoxycyclopentylacetate),
4,4'-sulfonyldibutyl bis(2,3-epoxycyclopentylpropionate),
2,2'-sulfonyldiethyl bis(3-oxatricyclo[3.2.1.0$^{2,4}$]octane-6-carboxylate), and the like.

Still other diepoxides contemplated include, for example, the 3-oxatetracyclo[4.4.0.1$^{7,10}$.0$^{2,4}$]undec-8-yl vicinal-epoxyalkanoates,
the 3-oxatetracyclo[4.4.0.1$^{7,10}$.0$^{2,4}$]undec-8-yl vicinal-epoxycycloalkanecarboxylates,
the 3-oxatetracyclo[4.4.0.1$^{7,10}$.0$^{2,4}$]undec-8-yl vicinal-epoxycycloalkylalkanoates,
the 3-oxatetracyclo[4.4.0.1$^{7,10}$.0$^{2,4}$]undec-8-yl 3-oxatricyclo[3.2.1.0$^{2,4}$]octyl-6-alkanoates,
and the like.

Specific examples include
3-oxatetracyclo[4.4.0.1$^{7,10}$.0$^{2,4}$]undec-8-yl 2,3-epoxypropionate,
3-oxatetracyclo[4.4.0.1$^{7,10}$.0$^{2,4}$]undec-8-yl 2,3-epoxybutyrate,
3-oxatetracyclo[4.4.0.1$^{7,10}$.0$^{2,4}$]undec-8-yl 9,10-epoxystearate,
3-oxatetracyclo[4.4.0.1$^{7,10}$.0$^{2,4}$]undec-8-yl 9,10,12,13-diepoxystearate,
3-oxatetracyclo[4.4.0.1$^{7,10}$.0$^{2,4}$]undec-8-yl 2,3-epoxycyclopentanecarboxylate,
3-oxatetracyclo[4.4.0.1$^{7,10}$.0$^{2,4}$]undec-8-yl 3,4-epoxycyclopentanecarboxylate,
3-oxatetracyclo[4.4.0.1$^{7,10}$.0$^{2,4}$]undec-8-yl 4-methyl-2,3-epoxycyclopentanecarboxylate,
3-oxatetracyclo[4.4.0.1$^{7,10}$.0$^{2,4}$]undec-8-yl 2-methyl-3,4-epoxycyclohexanecarboxylate,
3-oxatetracyclo[4.4.0.1$^{7,10}$.0$^{2,4}$]undec-8-yl 3-oxatricyclo[3.2.1.0$^{2,4}$]octane 6-carboxylate,
3-oxatetracyclo[4.4.0.1$^{7,10}$.0$^{2,4}$]undec-8-yl 3-oxatricyclo[3.2.1.0$^{2,4}$]octyl-6-acetate,
3-oxatricyclo[3.2.1.1$^{5,5}$.0$^{2,4}$]octyl-6-methyl-3-oxatricyclo[3.2.1.1$^{5,5}$.0$^{2,4}$]octane-6-carboxylate,
tetraethylene glycol bis(3-oxatricyclo[3.2.1.0$^{2,4}$]octane-6-carboxylate),
ethylene glycol bis(3-oxatricyclo[3.2.1.0$^{2,4}$]octane-6-carboxylate),
bis(3-oxatricyclo[3.2.1.0$^{2,4}$]octyl-6-methyl)maleate,
ethyl bis(3-oxatricyclo[3.2.1.0$^{2,4}$]octyl-6-methyl-1,2,4-pentadiene dioxide),
dipentene dioxide,
1,2-5,6-diepoxycyclooctane,
butadiene dioxide,
divinyl benzene dioxide,
4,10-dioxatetracyclo[5.4.0$^{3,5}$.0$^{1,7}$.0$^{9,11}$]undecane,
bis-2,3-epoxycyclopentyl 4,8-dioxatricyclo[5.1.0.0$^{3,5}$]octane,
1,2,4,5-diepoxycyclohexane,
1,2,3,4,5,8-hexahydro-6,7,9,10-diepoxynaphthalene,
6-epoxyethyl-3-oxatricyclo[3.2.1.0$^{2,4}$]octane, and the like.

The diepoxy diester sulfones can be prepared by the reaction of, for example, omega,omega'-thioalkanol bis-(cycloalkenecarboxylate), omega,omega'-thioalkanol bis-(bicycloalkenylcarboxylate), and the like, with at least four mols of peracetic acid per mol of sulfide reagent. In this reaction, the sulfide moiety, i.e., —S—, is oxidized to the sulfonyl group, i.e., —SO$_2$—, and oxirane oxygen is introduced at the site of both carbon to carbon double bonds of the sulfide reagent. The omega,omega'-thiodialkanol di(unsaturated esters), in turn, can be prepared by the diesterification of stoichiometric quantities of a thiodialkanol, e.g., thiodiglycol, 3,3'-thiodipropanol, 8,8'-thiodioctanol, and the like, with an unsaturated organic acid, e.g., 3-cyclohexenecarboxylic acid, bicyclo[2.2.1]-5-heptene-2-carboxylic acid, and the like, in toluene or other appropriate inert organic media, using a sulfuric acid catalyst, and heating under reflux until the water formed by the reaction is completely removed as the lower layer of the distillate. The catalyst is then neutralized with an excess of sodium acetate, and after filtration, the esterification product is distilled, recovering the corresponding omega,omega'-thiodialkanol di(unsaturated ester).

Further contemplated diepoxides include diglycidyl acetal,
4-(3,4-epoxy-6-methylcyclohexylmethyl)-3,5,8-trioxabicyclo[5.1.0]octane,
3-epoxyethyl-spiro[5.5]-2,4-dioxa-9,10-epoxyundecane,
4-(3,4-epoxybutyl)-3,5,8-trioxabicyclo[5.1.0]octane,
4-pentenal-di(6-methyl-3,4-epoxycyclohexylmethyl)acetal,
2-propyl-4,5-di(1-methyl-1,2-epoxyethyl)-1,3-dioxolane,
4-(6'-tricyclo[3.2.1$^{1,5}$.0$^{2,4}$]-3'-oxatricyclo)-3,5,8-trioxabicyclo[5.1.0]octane,
bis(6-methyl-3,4-epoxycyclohexylmethyl)formal,
bis(3,4-epoxycyclohexylmethyl)formal and the like.

Still other suitable diepoxides are epoxidized stearates such as, for instance:
ethylene glycol bis(9,10-epoxystearate),
2-ethyl-2,3-epoxyhexyl-9,10-epoxystearate,
2-ethyl-1,3-hexanediol bis(9,10-epoxystearate),
3,4-epoxy-6-methylcyclohexylmethyl-9,10-epoxystearate,
2-ethylhexyl mono- and di-epoxystearates from Aliphat 44–A or from Neo-Fat 3–R,
alkyl-9,10,12,13-depoxystearate,
3-methyl-1,5-pentanediol bis(9,10-epoxystearate),
2-ethyl-1,5-pentanediol bis(9,10-epoxystearate),
9,10-epoxystearyl-9,10-epoxystearate,
propylene-1,3-bis(3,4-epoxybutanoate),
2-ethylhexane-1,3-bis(3,4-epoxybutanoate),
4,5-epoxypentyl-4,5-epoxypentanoate,
epoxidized 3-methyl-1,5-pentanediol adipate-4-pentenoate,
ethyl-2,3-4,5-diepoxyhexanoate,
methyl-2,3-4,5-diepoxyhexanoate,
2,3-4,5-diepoxyhexanoic acid,
1,5-pentanediol-bis(5,6-epoxy-3,3,5-trimethylhexanoate,
1,5-pentanediol bis(2,3-epoxy-2-ethylhexanoate),
3,4-epoxy-6-methylcyclohexylmethyl-2,3-epoxy-2-ethylhexanoate.

Still other diepoxides include bis(2,3-epoxybutylphenyl)-2-ethylhexyl phosphate,
diethyl bis(2,3-epoxypropoxy)silane,
epoxide ester of soybean oil alcohols,
alkyl ester of epoxidized safflower oil fatty acids,
alkyl ester of epoxidized tall oil fatty acids,
nonylphenyl epoxytallate,
1,2,5,6-diepoxy-2,5-dimethylhexane-3,4-diol,
3-methyl-1,5-pentanediol bis(4,5-epoxyvalerate),
2,3-epoxybutyl-2,3-epoxybutyrate,
N,N'-ethylene bis(4,5-epoxycyclohexane-1,2-dicarboximide,
N,N'-ethylene bis(3-oxatricyclo[3.2.1$^{1,5}$.0$^{2,4}$]-octane-6-carboxamide),
digylcidyl carbonate,
di(2-methylglycidyl)carbonate,
bis(3,4-epoxy-6-methylcyclohexylmethyl)carbonate,
glycidyl-2,3-epoxy-2-ethylhexyl carbonate,
glycidyl-2,3-epoxycyclopentyl carbonate, and the like.

Additional diepoxides are: 1,2-5,6-diepoxycyclohexane, 1,2-4,5-diepoxycyclopentane, 2,3-dimethyl butadiene dioxide, 1,2-diglycidyloxydioxane, and diepoxydioxane.

Many of the foregoing diepoxides can be generally described as having the formula

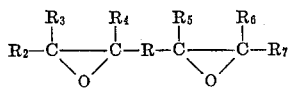

wherein R can be a bond between adjacent carbon atoms or a divalent organic group composed entirely of carbon and hydrogen such as alkylene, cycloalkylene, alkenylene and arylene groups; or a divalent organic group composed entirely of carbon, hydrogen and oxygen such as groups containing at least one ester structure, including monoesters, diesters, polyesters, unsaturated esters; or groups containing at least one ether linkage including diethers, cyclic ethers, and unsaturated ethers, or groups containing a glycol residue; or a divalent organic group composed entirely of carbon, hydrogen and nitrogen such as groups containing amide structures such as a diamide grouping; or a divalent group containing a structure composed of carbon and oxygen such as a carbonate grouping; or a divalent inorganic group containing a structure composed of oxygen and a nonmetal such as a phosphate or a sulfone group, or a silane group.

$R_2$, $R_3$, $R_6$ and $R_7$ can be hydrogen, a monovalent organic group, such as an alkyl group, e.g., a methyl, ethyl or propyl group, or a monovalent organic group such as an ester containing group or an acid containing group or a divalent organic group such as an alkylene, alkylidene or cycloalkylene group or a divalent ester containing group; and $R_4$ and $R_5$ can be hydrogen or a monovalent or divalent group, e.g., alkyl such as methyl, ethyl, and neopentyl or aryl such as phenyl or alkylene, alkylidene or arylene.

The preferred diepoxides are those wherein each of the oxirane groups is connected to an electron donating substituent which is not immediately connected to the carbon atoms of that oxirane group. These diepoxides have both of the oxirane groups corresponding to the formula

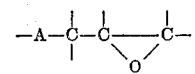

wherein A is an electron donating substituent such as —O—,

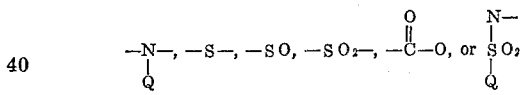

and Q is a saturated hydrocarbon radical, as saturated is defined above, e.g. an alkyl, cycloalkyl, aryl or aralkyl group.

Among suitable epihalohydrins and mixtures thereof which with epoxides can be reacted with dihydric phenols to produce the thermoplastic polyhydroxyethers of this invention are those having the general formula:

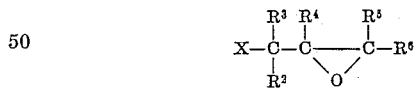

wherein $R^2$, $R^3$, $R^4$, $R^5$, and $R^6$ which can be the same or different are hydrogen or organic radicals such as alkyl, cycloalkyl, aryl, alkylene and arylene and X is a halogen atom, i.e., chlorine, bromine, and the like. Specific epihalohydrins are epichlorohydrin, epibromohydrin, 1,2-epoxy-1-methyl-3-chloropropane and 1,2-epoxy-2-methyl-3-chloropropane.

Reduced viscosity herein was determined by weighing a 0.2 gram sample of polydihydroxyether into a 100 ml. volumetric flask and adding a solvent thereto. After solution was complete, additional solvent was added to exactly the 100 ml. mark while the flask was maintained in a 25° C. constant temperature bath. The solution was thereafter filtered through a sintered glass funnel and the viscosity of a 3 ml. sample determined in an Ostwalt viscometer at 25° C. Reduced viscosity values were computed by use of the equation:

$$RV = \frac{t_s - t_o}{ct_o}$$

wherein:
$t_o$ is the efflux time for the solvent
$t_s$ is the efflux time for the polydihydroxyether solution $c$ is the concentration of the polydihydroxyether solution in terms of grams of polydihydroxyether per 100 ml. of solution The solvent used was tetrahydrofuran unless otherwise stated.

These thermoplastic polyhydroxyethers are modifiable with the above modifying agents by any of a variety of means providing intimate contact between the modifying agent and the thermoplastic polyhydroxyether and preferably agitation with heat. For example, the thermoplastic polyhydroxyether and crosslinking agent can be codissolved in a mutual solvent or melted together on a two-roll mill, or fluxed together in a compounding extruder or similar apparatus such as a Banbury mixer. Other means generally used to crosslink thermoplastic materials are useful as will be apparent to those skilled in the art.

The use of the above modifying agents with thermoplastic polyhydroxyethers in virtually any concentration is productive of a generally favorable modification of polymer properties. The concentration of the modifying agent should not exceed, however, 30 percent by weight based on the polyhydroxyether as the polymer properties are lost to the composition. Conversely use of less than about 0.01 percent by weight modifying agent based on the polyhydroxyether confers only negligible property improvement on the polyhydroxyethers; above about 0.5 percent by weight of modifying agent based on the polyhydroxy ether imparts significant property improvement. The improvement in polyhydroxyether properties from about 0.5 to about 10 percent by weight of modifying agent based on the polyhydroxyether is not proportionately increased by further increasing the modifying agent concentration to between 10 and 30 percent by weight. Hence, concentrations of modifying agent between 0.5 to 10 percent by weight are preferred. A particularly desirable balance of improved polyhydroxyether properties are achieved by the use of from about 3 to about 10% of a modifying agent having two polyhydroxyether reactive groups and 1 to 6% of a modifying agent having three or more polyhydroxyether reactive groups based on the polyhydroxyether and, hence, this concentration of these modifying agents is particularly preferred.

Among the modifications of thermoplastic polyhydroxyethers caused by reacting with the modifying agents of this invention, one of the most important is an increase in the gel content of the polymer. This property is a measure of the resistance to swelling of the polymer when in contact with solvents; and resistance to swelling is an index to solvent resistance. Thus, as percent gel increases, solvent resistance increases. For most end-use applications a greater solvent resistance and higher molecular weight is desirable and the polyhydroxyether should have at least 15% gel content. Also higher gel content generally means greater stress crack resistance. On the other hand, adhesional characteristics of the modified polyhydroxyethers of this invention are apparent in resins containing no measurable gel content, i.e., 0% gel.

The practice of the present invention is illustrated by the following examples wherein all parts and percentages are by weight unless otherwise specified.

Percent gel was determined by immersing a 0.3 gram piece of a 20 mil, cured, compression molded plaque of polyhydroxyether enclosed in a 100 mesh copper wire cage, in dimethyl formamide for 16 hours at 140° C. The cage and contents after this period were dried at 110° C. for 3 hours. The weight of the resin in the cage divided by 0.3 and multiplied by 100 was the percent gel.

Melt flow was determined according to ASTM D-1238–57T. As provided therein, 1P melt flow refers to the decigrams of resin extruded in one minute through a standard orifice at 190° C. and 44 pounds per square inch pressure, 10P melt flow is the value found at 190° C. and 440 pounds per square inch pressure.

Stress cracking resistance and stress crazing resistance was measured by bending a 20 mil plaque of the modified polyhydroxy-ether in an arc and dripping acetone on the top of the arc. Stress cracking resistance was rated 1 if no cracking occurred, 2, if cracking appeared within 15–30 seconds after acetone contact and, 3, if there was no difference between the modified polyhydroxyether and the unmodified control i.e. instantaneous cracking. Stress crazing is essentially relative fineness of the cracks and was measured in the same way as stress cracking. Stress crazing was rated 1 if no crazing occurred, 2–5 for degrees of crazing, and 6 if instantaneous crazing occured, i.e. no difference between modified polyhydroxyether and unmodified control.

In each of the following examples thermoplastic polyhydroxyether was fluxed at 180° C. on a two roll mill. The temperature on the mill was dropped to 140° C. and the modifying agent milled into the polymer with ten end passes. The blend was sheeted and portions of the sheet were stripped off and compression mold cured at 5000 p.s.i. and 180° C. for 30 minutes.

The thermoplastic polyhydroxyether used in the succeeding examples unless otherwise stated was prepared as follows.

There was placed in a flask

|   | Parts |
|---|---|
| 2,2-bis(4-hydroxyphenyl)propane | 114.15 |
| Epichlorohydrin (99.1% pure) | 46.8 |
| Ethanol | 96.0 |
| Butanol | 10.0 |
| Sodium hydroxide (97.5% pure) | 22.6 |
| Water | 70.0 |

The above mixture was stirred at room temperature for sixteen hours to accomplish the initial coupling reaction. The mixture was then heated at 80° C. for an hour. Thereupon, approximately sixty five parts of a 7:3 mixture of toluene:butanol was added to the flask. Heating of the mixture at 80° C. was continued another two hours. There was added to the flask an additional fifty five parts of the 7:3 toluene:butanol mixture and 4.5 parts of phenol. The contents of the flask were continued and heated at 80° C. (reflux) for two hours and then allowed to cool. Total reaction time at 80° C. was five hours. Upon cooling the reaction mixture was cut with about two hundred and twenty parts of the 7:3 toluene:butanol mixture. One hundred parts of water was added to the flask and agitated with the contents to dissolve salts present in the reaction mixture. The flask contents were allowed to settle for ten minutes, during which time a lower brine phase formed. This lower phase was separated by decantation. The upper polymer solution containing phase was washed successively with two one hundred sixty part portions of water containing 4.5 percent butanol. The washed polymer was then coagulated in isopropanol, filtered and dried. Reduced viscosity was above 0.5, measured at 25° C. as a 0.2 gram sample in 100 milliliters of tetrahydrofuran.

Examples 1–3

Thermoplastic polyhydroxyether was modified with 10 percent of:

Example 1.—Diglycidylether of 2,2-bis(4-hydroxyphenyl) propane

Example 2.—Solid condensation reaction product of epichlorohydrin and 2,2-bis(4-hydroxyphenyl)propane having an epoxy assay of 900–1025. (Epoxy assay is number of grams of product containing one gram-mole of epoxy.)

Example 3.—3,4 - Epoxy - 6 - methylcyclohexylmethyl 3,4-epoxy-6-methylcyclohexanecarboxylate Results of the modification on gel content, melt flow, stress cracking and stress crazing are presented in Table I below

TABLE I

| Example | Thermoplastic Polyhydroxy-ether (parts) | Modifying Agent (parts) | Gel, Percent | Melt Flow 10P, dg./min. | Stress Cracking | Stress Crazing |
|---|---|---|---|---|---|---|
|   | 100 | 0 | 0 | 41 | 3 | 6 |
| 1 | 100 | 10 | 5 | 28 | 2 | 5 |
| 2 | 100 | 10 | 13 | 25 | 1 | 4 |
| 3 | 100 | 10 | 11 | 32 | 2 | 5 |

Example 4

Thermoplastic polyhydroxyether is dissolved in a mixture of tetrahydrofuran, toluene and Cellosolve and an equivalent amount of a diepoxide modifying agent, 4-vinylcyclohexane dioxide was added. The solution is dip coated onto a steel panel, air dried 4 hours and then baked at 350° F. for 30 minutes.

The resulting coating is superior to an unmodified control upon exposure to these test environments: 1/1 toluene/$H_2SO_4$; 5% $HNO_3$, 5% $CH_3COOH$; 5% NaOH and steam.

Examples 5–6

Thermoplastic polyhydroxyether was modified with 10 percent of:

Example 5.—Diglycol chloroformate
Example 6.—Dichloroformate of 2,2-bis(4-hydroxyphenyl)propane Results of the modification on gel content, melt flow, stress cracking and stress crazing are presented in Table II below.

TABLE II

| Example | Thermoplastic Polyhydroxy-ether (parts) | Modifying Agent (parts) | Gel, Percent | Melt Flow 10P, dg./min. | Stress Cracking | Stress Crazing |
|---|---|---|---|---|---|---|
|   | 100 | 0 | 0 | 41 | 3 | 6 |
| 4 | 100 | 10 | 27 | 5 | 1 | 2 |
| 5 | 100 | 10 | 49 | 0.3 | 1 | 1 |

Example 7

Polyhydroxyether at 20% and diglycol chloroformate are codissolved in chloroform and cast into film; the solvent is evaporated and the film cured 30 minutes at 180° C. Proportions of modifying agent are 0.1 part (Example 6A) 3 parts (Example 6B) and 10 parts (Example 6C) and 20 parts (Example 6D) per 100 parts of the polymer.

The results expected are summarized in Table III.

TABLE III

| Ex. | Thermoplastic Polyhydroxy-ether (parts) | Modifying Agent (parts) | Gel, Percent | Cracking | Crazing |
|---|---|---|---|---|---|
|   | 100 | 0 | 0 | 3 | 6 |
| 6A | 100 | 0.1 | 3 | 2 | 5 |
| 6B | 100 | 3 | 23 | 1 | 4 |
| 6C | 100 | 10 | 54 | 1 | 1 |
| 6D | 100 | 20 | 86 | 1 | 1 |

Examples 8–10

Thermoplastic polyhydroxyether was modified with 10 percent of

Example 8.—Ethyltrichloro silane
Example 9.—Diphenyl dichlorosilane
Example 10.—Tetra ortho silicate Results of the modification on gel content, melt flow, stress cracking and stress crazing are presented in Table IV below.

TABLE IV

| Example | Thermoplastic Polyhydroxy-ether (parts) | Modifying Agent (parts) | Gel, Percent | Melt Flow 10P, dg./min. | Stress Cracking | Stress Crazing |
|---|---|---|---|---|---|---|
|   | 100 | 0 | 0 | 41 | 3 | 6 |
| 8 | 100 | 10 | 22 | 11 | 1 | 2 |
| 9 | 100 | 10 | 13 | 27 | 1 | 3 |
| 10 | 100 | 10 | 2 | 36 | 2 | 5 |

Example 11

Thermoplastic polyhydroxyether was modified with 10 percent of dimethyl ether of dimethylol urea.

Results of the modification on gel content, melt flow, stress cracking and stress crazing are presented in Table V below.

TABLE V

| Example | Thermoplastic Polyhydroxy-ether (parts) | Modifying Agent (parts) | Gel, Percent | Melt Flow 10P, dg./min. | Stress Cracking | Stress Crazing |
|---|---|---|---|---|---|---|
|   | 100 | 0 | 0 | 41 | 3 | 6 |
| 11 | 100 | 10 | 23 | 0.19 | 1 | 2 |

Example 12

Example 11 is duplicated substituting 10 parts of the diethyl ether of dimethylol urea for the dimethyl ether of dimethylol urea. Similar improvement in gel content, stress crazing and cracking is observed.

Examples 13–16

Thermoplastic polyhydroxyether was modified with 10 percent of:

Example 13.—Tetrabutyl titanate
Example 14.—Aluminum acetyl acetonate
Example 15.—Zinc acetyl acetonate
Example 16.—Zirconium acetyl acetonate Results of the modification on gel content, melt flow, stress cracking and stress crazing are presented in Table VI below.

TABLE VI

| Example | Thermoplastic Polyhydroxyether (parts) | Modifying Agent (parts) | Gel, Percent | Melt Flow 10P, dg./min. | Stress Cracking | Stress Crazing |
|---|---|---|---|---|---|---|
|  | 100 | 0 | 0 | 41 | 3 | 6 |
| 13 | 100 | 10 | 11 | 0.29 | 2 | 5 |
| 14 | 100 | 10 | 37 | 1.4 | 1 | 2 |
| 15 | 100 | 10 | .32 | 3 | 1 | 3 |
| 16 | 100 | 10 | 46 | 0.6 | 1 | 1 |

Example 17

Thermoplastic polyhydroxyether was modified with 10 percent of:

Example 17.—Dimethyl sulfate

Results of the modification on gel content, melt flow, stress cracking and stress crazing are presented in Table VII below.

TABLE VII

| Example | Thermoplastic Polyhydroxyether (parts) | Modifying Agent (parts) | Gel, Percent | Melt Flow 10P, dg./min. | Stress Cracking | Stress Crazing |
|---|---|---|---|---|---|---|
|  | 100 | 0 | 0 | 41 | 3 | 6 |
| 17 | 100 | 10 | 14 | 23 | 1 | 4 |

Examples 18–19

Example 17 is duplicated substituting diethyl sulfate (Example 18) and dibutyl sulfate (Example 19) for dimethyl sulfate. Similar improvements in gel content, stress crazing and stress cracking are observed.

Examples 20–21

Thermoplastic polyhydroxyether was modified with 10 percent of zinc chloride (Example 20) and aluminum trichloride (Example 21).

Results of the modification on gel content, melt flow, stress cracking and stress crazing are presented in Table VIII below.

TABLE VIII

| Example | Thermoplastic Polyhydroxyether (parts) | Modifying Agent (parts) | Gel, Percent | Melt Flow 10P, dg./min. | Stress Cracking | Stress Crazing |
|---|---|---|---|---|---|---|
|  | 100 | 0 | 0 | 41 | 3 | 6 |
| 20 | 100 | 10 | 17 | 26 | 1 | 4 |
| 21 | 100 | 10 | 11 | 29 | 2 | 5 |

Examples 22–24

Thermoplastic polyhydroxyether was modified with 10 percent of:

Example 22.—Glycol diformate
Example 23.—Glycol dipropionate
Example 24.—Triglycidyl di-(2-ethylhevanoate)

Results of the modification on gel content, melt flow, stress cracking and stress crazing are presented in Table IX below.

TABLE IX

| Example | Thermoplastic Polyhydroxyether (parts) | Modifying Agent (parts) | Gel, Percent | Melt Flow 10P, dg./min. | Stress Cracking | Stress Crazing |
|---|---|---|---|---|---|---|
|  | 0 | 0 | 0 | 41 | 3 | 6 |
| 22 | 100 | 10 | 19 | 25 | 1 | 4 |
| 23 | 100 | 10 | 4 | 34 | 2 | 5 |
| 24 | 100 | 10 | 12 | 30 | 2 | 5 |

Examples 25–33

Examples 1, 5, 7, 10, 11, 14, 17, 20 and 22 are duplicated but substituting as the thermoplastic polyhydroxyether one of the following:

Examples 25–33(B).—Thermoplastic polyhydroxyether prepared as above but substituting as the dihydric phenol 1,3-bis(4-hydroxyphenyl)-1-ethyl cyclohexane.

Examples 25–33(C).—Thermoplastic polyhydroxyether prepared as above but substituting as the dihydric phenol the condensation reaction product of two moles of phenol and one mole of limonene or its isomers such as dipentene.

Examples 25–33(D).—Thermoplastic polyhydroxyether prepared as follows.

A polyhydroxyether was prepared as follows:

A vessel was charged with 22.6 parts of 2,2-bis(4-hydroxyphenyl)propane, 40.0 parts of ethanol, 6.5 parts of water, and 0.76 part of the disodium salt of bisphenol-A (as hexahydrate). To the stirred mixture, 8.83 parts of mesobutadiene dioxide was added and heat applied to permit reflux (80° C.). After 2½ hours at reflux, 30 parts of dimethoxyethane and 30 parts of dimethylsulfoxide were added to dissolve the precipitated polymer. Reflux was continued for an additional 24 hours. The solution was cooled, the polymer coagulated in isopropanol, and vacuum dried to yield a white powder. The polymer had a reduced viscosity of 0.25 in dimethylformamide and formed clear, water-white films when compressed at 140° C. An epoxy assay of the powder gave a value of greater than 10,000 g. of polymer per epoxy unit which is indicative of very little residual epoxy. A phenolic hydroxyl determination indicated that two phenolic hydroxyls were present for every 40 polymer units of the following type:

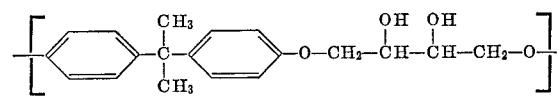

Examples 1, 5, 7, 10, 11, 14, 17, 20 and 22 are duplicated but substituting as the thermoplastic polyhydroxyether a polymer having the repeating unit next above.

What is claimed is:

1. Thermoplastic polyhydroxyether composition having improved resistance to stress cracking which comprises the reaction product of: (1) thermoplastic polyhydroxyether having the general formula

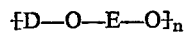

wherein D is the radical residuum of a dihydric phenol, E is a radical residuum of an epoxide selected from mono- and di-epoxides and contains from 1 to 2 hydroxyl groups and $n$ is an integer which represents the degree of polymerization and is at least 30, and (2) from 0.1 to 30 percent by weight based on the thermoplastic polyhydroxyether of a modifying cross-linking agent selected from the group consisting of polyvalent metal halides of Groups II-A, III-A, IV-B and VIII of the Deming Periodic Table, tetrabutyl titanate, aluminum acetyl acetonate, zinc acetyl acetonate and zirconium acetyl acetonate.

2. Composition claimed in claim 1 wherein the modifying crosslinking agent is a polyvalent metal halide.

3. Composition claimed in claim 2 wherein the polyvalent metal halide is zinc chloride.

4. Composition claimed in claim 2 wherein the polyvalent metal halide is aluminum chloride.

5. Composition claimed in claim 1 wherein the modifying crosslinking agent is tetrabutyl titanate.

6. Composition claimed in claim 1 wherein the modifying crosslinking agent is aluminum acetyl acetonate.

7. Composition claimed in claim 1 wherein the modifying crosslinking agent is zinc acetyl acetonate.

8. Composition claimed in claim 1 wherein the modifying crosslinking agent is zirconium acetyl acetonate.

References Cited

UNITED STATES PATENTS 3,177,090    4/1965    Bayes et al.

WILLIAM H. SHORT, *Primary Examiner.*

T. D. KERWIN, *Assistant Examiner.*